United States Patent [19]

Meitzler

[11] Patent Number: 5,669,149

[45] Date of Patent: Sep. 23, 1997

[54] FOLDING FRAMING SQUARE AND LAYOUT TOOL

[76] Inventor: Robert A. Meitzler, 4462 Harpeth School Rd., Franklin, Tenn. 37064

[21] Appl. No.: 743,173

[22] Filed: Nov. 5, 1996

Related U.S. Application Data

[63] Continuation of Ser. No. 559,481, Nov. 15, 1995, abandoned, which is a continuation of Ser. No. 388,625, Feb. 14, 1995, abandoned.

[51] Int. Cl.⁶ ........................................ B43L 7/10
[52] U.S. Cl. ........................................ 33/471; 33/417
[58] Field of Search .................. 33/471, 474, 475, 33/476, 478, 465, 425, 416, 417, 418

[56] References Cited

U.S. PATENT DOCUMENTS

| | | | |
|---|---|---|---|
| 212,817 | 3/1879 | Neary | 33/416 |
| 296,157 | 4/1884 | Gabriel | 33/475 |
| 339,158 | 4/1886 | Finley | 33/418 |
| 941,313 | 11/1909 | Easley | 33/DIG. 16 |
| 1,014,402 | 1/1912 | Larsen | 33/465 X |
| 1,110,195 | 9/1914 | Erwin | 33/486 |
| 1,196,519 | 8/1916 | Caylor | 33/476 |
| 1,296,660 | 3/1919 | Hayden | 33/465 X |
| 2,456,676 | 12/1948 | Chowns | 33/486 |
| 2,652,629 | 9/1953 | Prucker | 33/474 |
| 3,169,320 | 2/1965 | Currie . | |
| 3,345,750 | 10/1967 | Hill | 33/418 |
| 4,394,801 | 7/1983 | Thibodeaux | 33/471 X |
| 4,481,720 | 11/1984 | Sury | 33/471 X |
| 4,607,438 | 8/1986 | DeFrange | 33/451 |
| 5,253,426 | 10/1993 | Mosbrucker | 33/474 X |

*Primary Examiner*—G. Bradley Bennett
*Attorney, Agent, or Firm*—Edward D. Lanquist, Jr.; Waddey & Patterson

[57] ABSTRACT

The present invention discloses a folding framing square and layout tool which has an elongated base having a channel and two faces. Pivotally attached to the elongated base is an arm which opens up to a preset angle which is preferably ninety degrees (90°) and closes into the channel thereby taking up a limited amount of room. At the end of the elongated base opposite the pivoting point there is placed a tab which allows the user to layout a preset distance for marking the location of studs. The preset angle of the arm with respect to the elongated base is adjustable and correctable. Linear gauges are placed on both edges of each of the arm and the elongated base. Additionally, pitch gauges are placed on one end or both of the arm and elongated base that indicate a pitch based upon the intersection of either of the arm or the elongated base across the pitch gauge. An angle marker is placed on the pivoting point to show the angle of the arm with respect to the elongated base. Plural holes are provided in the arm which allows the user to travel elongated base along a work piece thereby marking a spot for cutting or other reasons.

20 Claims, 4 Drawing Sheets

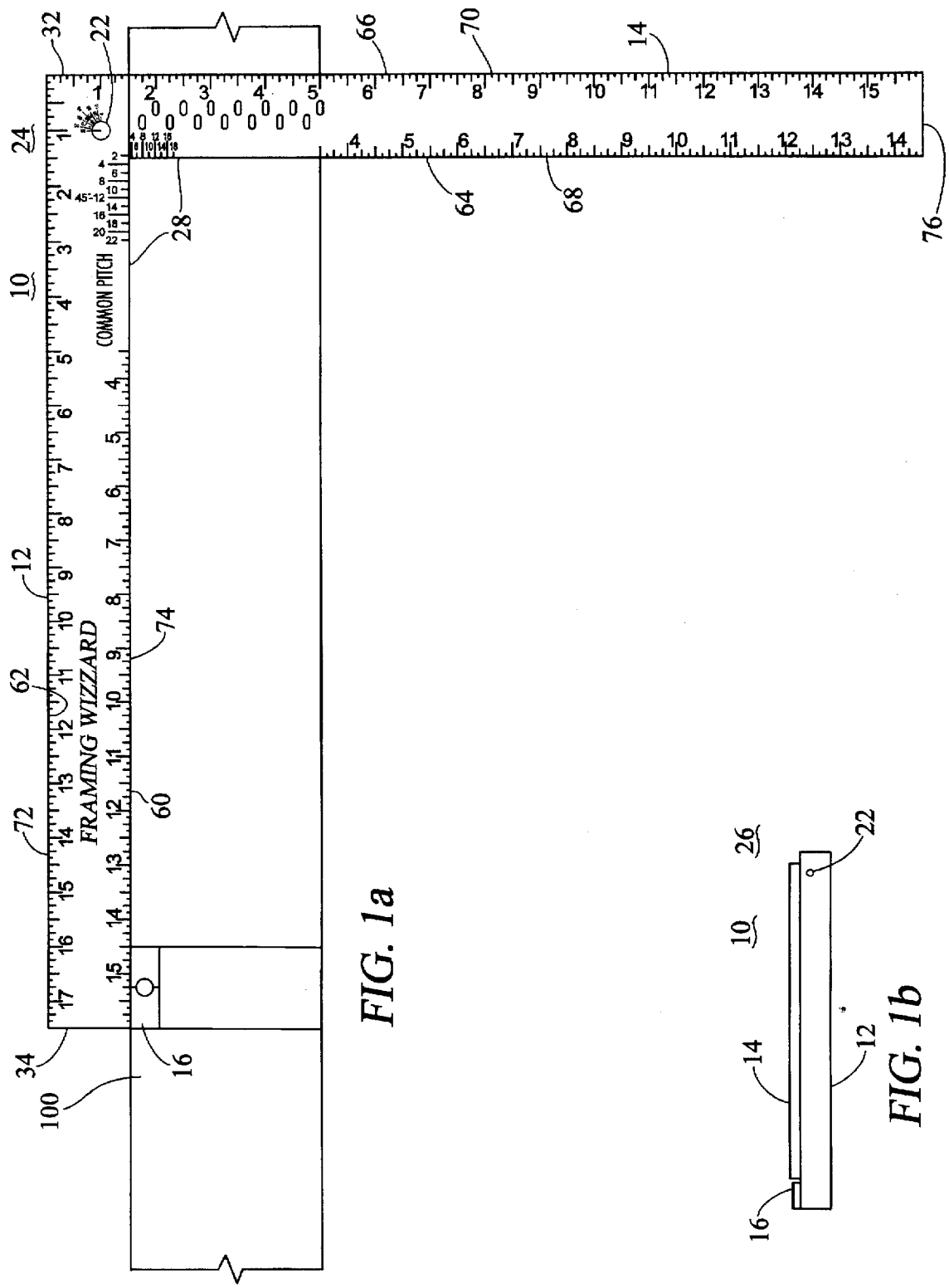

5,669,149

FOLDING FRAMING SQUARE AND LAYOUT TOOL

This application is a continuation of application Ser. No. 08/559,481 filed Nov. 15, 1995, now abandoned, which is a continuation of application Ser. No. 08/388,625 filed Feb. 14, 1995, now abandoned.

BACKGROUND OF THE INVENTION

The present invention relates generally to a carpentry tool and more particularly to a folding framing square and layout tool.

It will be appreciated by those skilled in the art that framing squares are used by every framing carpenter. A framing square allows the carpenter to make sure that every piece is squared that needs to be squared and also allows the carpenter to measure linear distances. Unfortunately, these framing squares are by their nature, in the prior art, L-shaped and relatively large, often approximately two feet by one foot six inches. This makes them difficult to carry. Additionally, they are capable of measuring only ninety degree (90°) angles. The ninety degree limitation also makes the square very cumbersome.

It will be further appreciated by those skilled in the art that in remodeling, often times common pitches and hip valley roof pitchers need to be calculated so that they may be reproduced. Unfortunately, in the past, this has required a separate tool such as a protractor.

It will be further appreciated by those skilled in the art that often on a roof beam or floor joist, a section must be ripped out for a variety of reasons such as a lighting fixture, an intersecting beam, and the like. In the past, this must have been done by marking the desired distance in two locations and drawing a straight line or running a chalk line between them.

It will further be appreciated by those skilled in the art that in laying out wall studs, the preset distance of sixteen inch on-center is often used. In the past, in order to perform this task, a carpenter had to use a rigid framing square and measure the sixteen inch on-center. Not only does this leave significant room for mistake, it is also very time consuming.

It will further be appreciated by those skilled in the art that in order to lay out sixteen inch on-center, to measure roof pitches, to set angles, to rip a piece of wood, and to square a frame, a carpenter had to have several different tools.

What is needed, then, is a combination folding framing square and layout tool. This folding framing square must be capable of easy storage. This folding framing square must be openable to a preset angle, preferably at ninety degrees (90°). This preset angle must be capable of correction and adjustment. This folding framing square must be capable of laying out a ripping line simply and easily. This needed device must be capable of measuring both hip valley and common roof pitches. This needed device must be capable of laying out a preset distance quickly and easily. This needed device is presently lacking in the prior art.

SUMMARY OF THE INVENTION

The present invention discloses a folding framing square and layout tool which has an elongated base having a channel and two faces. Pivotally attached to the elongated base is an arm which opens up to a preset angle which is preferably ninety degrees (90°) and closes into the channel thereby taking up a limited amount of room. At the end of the elongated base opposite the pivoting point there is placed a tab which allows the user to layout a preset distance for marking the location of studs. The preset angle of the arm with respect to the elongated base is adjustable and correctable. Linear gauges are placed on both edges of each of the arm and the elongated base. Additionally, pitch gauges are placed on one end or both of the arm and elongated base that indicate a pitch based upon the intersection of either of the arm or the elongated base across the pitch gauge. An angle marker is placed on the pivoting point to show the angle of the arm with respect to the elongated base. Plural holes are provided in the arm which allows the user to travel the elongated base along a work piece thereby marking a spot for cutting or other reasons.

An object of this invention is to provide a folding framing square whose preset open angle can be adjusted and/or corrected.

A further object of the present invention is to provide a tool which can lay out preset on-center studs.

A still further object of the present invention is to provide a tool which allows for angle finders and/or roof pitch indicators.

A still further object of the present invention is to provide a rip guide or other marker which allows the device to travel along a work piece and to mark a preset distance from the surface upon which the device is travelling.

A still further object of the present invention is to provide a combination folding framing square, angle indicator, tip guide, and preset distance on-center layout.

A further object of the present invention is to provide a folding framing square.

BRIEF DESCRIPTION OF THE DRAWINGS

FIG. 1a is a plan view of the folding framing square and layout tool of the present invention as used to lay out studs or other objects at a set distance apart in an open position.

FIG. 1b is a plan view of the device of the present invention in a closed position.

DESCRIPTION OF THE PREFERRED EMBODIMENT

Figure 2A:
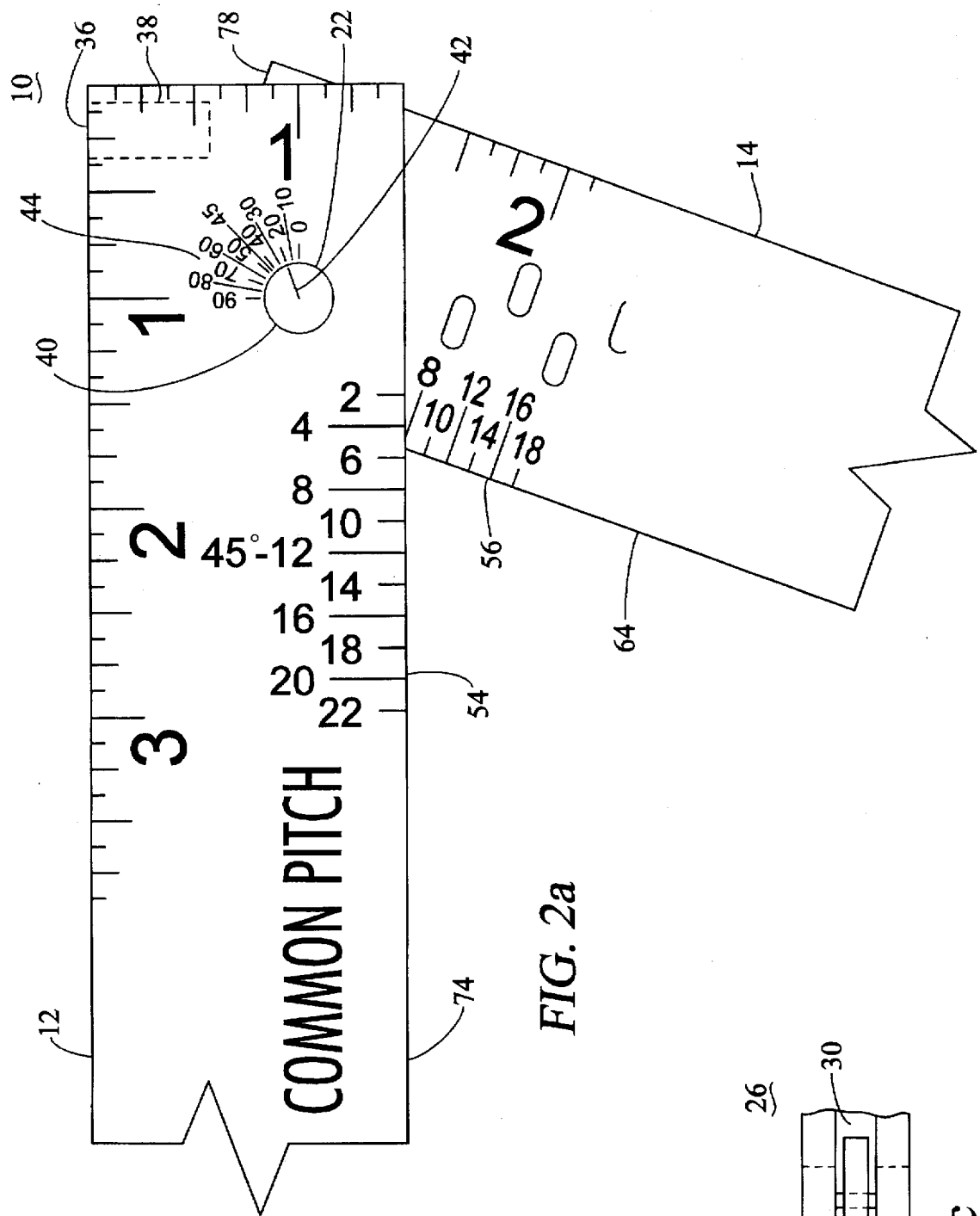
FIGS. 2a, 2b, and 2c show the device of the present invention as used as an angle finder.

Referring now to FIG. 1a, there is shown generally at 10 the folding framing square and layout tool of the present invention. Tool 10 comprises elongated base 12 pivotally attached to arm 14 at pivot point 22 proximal first or pivot end 32 of base 12. Tab 16 is attached to elongated base 12 at second or distal end 34. Along outer edge 72 of base 12 there is placed outer linear gauge 62 which in the preferred embodiment runs from first or pivot end 32 to second or pivot end 34. Similarly, inner edge 74 of base 12 as printed or etched on it inner linear gauge 60 which runs in increasing order from arm 14 to second or distal end 34. In the preferred embodiment, the distance from arm 14 to tab 16 is preset and is, in the preferred embodiment, sixteen inches (16") which allows studs to be laid out on work piece 100 sixteen inches (16") on-center. Interior linear gauge 68 is etched or printed on interior edge 64 of arm 14 running from inner edge 74 of elongated base 12 to far end 76 of arm 14. Exterior linear gauge 70 is printed on exterior edge 66 beginning on first or pivot end 32 and runs in increasing numerical order to far end 76 along arm 14. Location of linear gauges 60, 62, 68, and 70 allow user to officially measure linear distances depending upon the orientation of tool 10 on work piece 100. For example, inner edge 74 of tool 10 can be placed on work piece 100 which allows horizontal distance in the view shown in FIG. 1a to be measured along inner linear gauge 60. Conversely, in the view shown in FIG. 1a, vertical distance from top of work piece 100 can be efficiently measured along interior linear gauge 68.

FIG. 1a shows tool 10 in opened position 24. Conversely, FIG. 1b shows tool 10 in closed position 26. As can be seen, tab 16 remains fixed in relation to elongated base 12. However, arm 14 folds along pivot point 22 such that arm 14 and elongated base 12 are approximately aligned along the same plane.

Referring now to all of the drawings, various gauges are shown. The reverse side of tool 10 is a mirror image of each shown side thereby allowing user to use tool 10 whether he or she is right or left handed.

Referring now to FIG. 2a, there is shown generally at 10 the device of the present invention with particular emphasis placed on the various angle indicating portions of the invention. Initially, elongated base 12 has threaded orifice 38 that receives set screw 36 which extends into elongated base 12 and into channel (30 in FIG. 2) and contacts near end 78 of arm 14 so that preset angle (28 in FIG. 1) can be corrected or adjusted. In the preferred embodiment, tool 10 has three different angle finding indicators. Initially, at pivot point 22, there is placed pointer 42 which moves with arm 14 in relation to elongated base 12. Around rotating disc 40, upon which pointer 42 is placed, there is placed rotational gauge 44 which can be in any measurement but is, in the preferred embodiment, placed in degrees. Therefore, in open position (24 in FIG. 1a), pointer 42 should approach "90" on rotation gauge 44. In FIG. 1b, in a closed position (26 in FIG. 1b), pointer 42 should approach "0" on rotational gauge 44.

Additionally, in FIG. 2a, pitch gauges 54 and 56 are placed respectively on inner edge 74 and interior edge 64. In the preferred embodiment, common pitch gauge 54 is placed along inner edge 74 of elongated base 12 so that as arm 14 travels in relation to elongated base 12, the common pitch of arm 14 in relation to elongated base 12 is indicated on common pitch gauge 54 and its intersection by arm 24. Similarly, hip valley pitch gauge 56 is, in the preferred embodiment, placed on interior edge 64 of arm 14 which indicates hip valley pitch according to the position that elongated base 12 passes across interior edge 64. Similarly, common pitch is measured by the position that arm 14 passes along interior edge 74. Conversely, common pitch gauge 54 could be placed on arm 14 with hip valley pitch gauge 56 being placed upon elongated base 12.

Figure 2B:
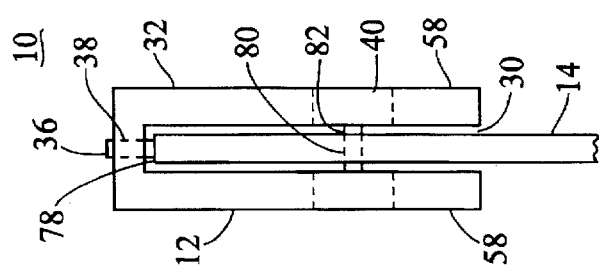

FIG. 2b is a detail of first or pivot end 32 of tool 10. As can be seen, arm 14 is received by channel 30 of elongated base 12 which is created by faces 58 of elongated base 12. Arm 14 has hole 80 which receives pin 82 which connects to rotating disc 40. Rotating disc 40 rotates freely in relation to elongated base 12. However, pin 82 and rotating disc 40 rotate in relation to arm 14. Further, FIG. 2b shows in greater detail how set screw 36 received by threaded orifice 38 contacts near end 78 of arm 14 thereby adjusting preset angle 28.

Figure 2C:
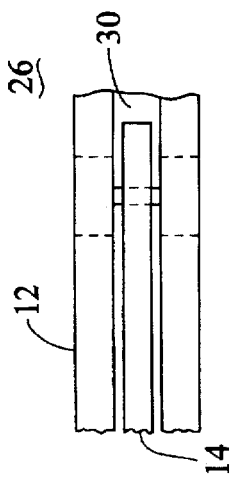

FIG. 2c shows the interaction between arm 14 and elongated base 12 in closed position 26. FIG. 2c further shows how arm 14 is received by channel 30.

Figure 3:
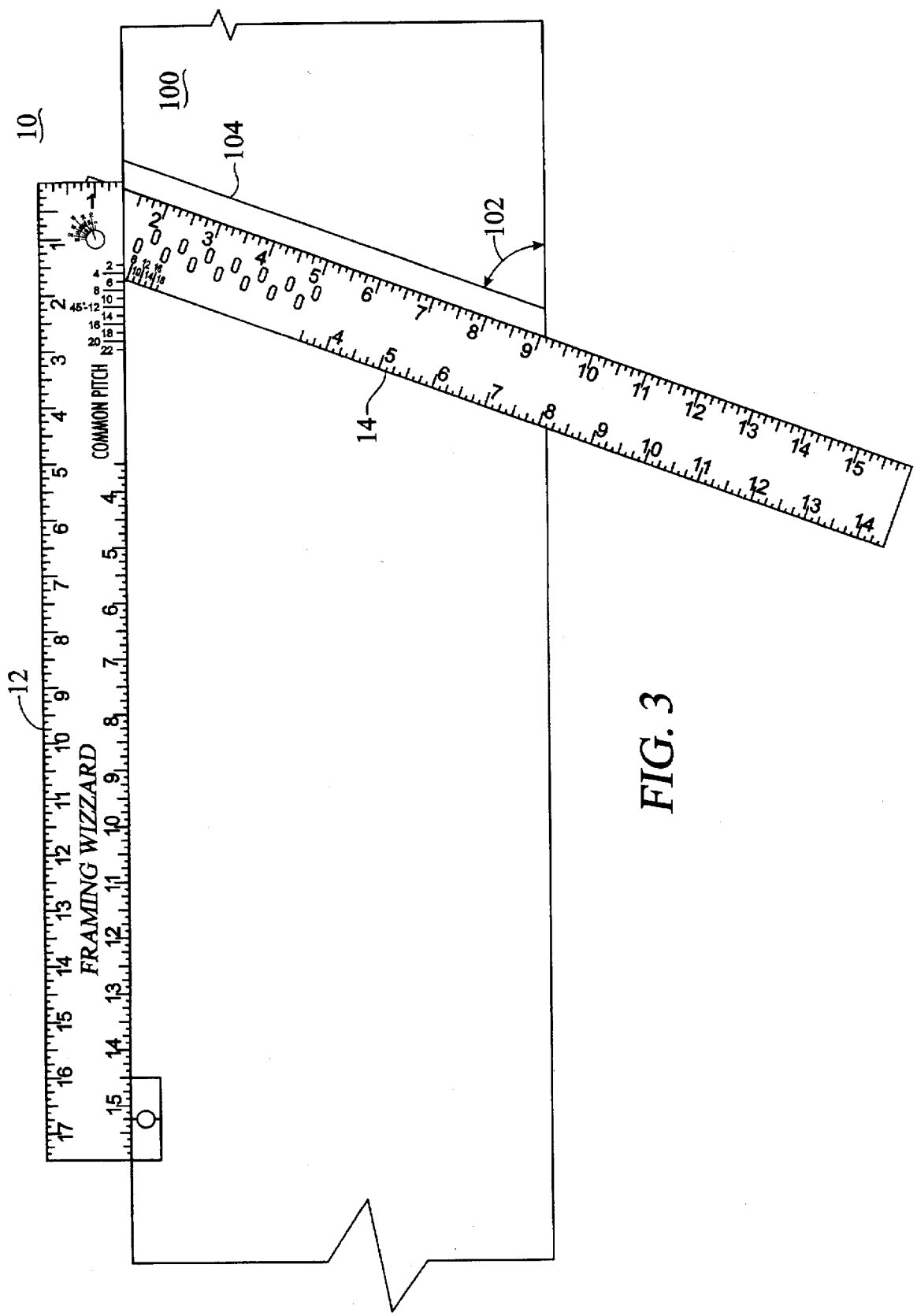
FIG. 3 is a plan view of the present invention showing the device as used to indicate common and hip valley roof pitches.

Referring now to FIG. 3, there is shown generally at 10 the tool of the present invention as used in connection with work piece 100 which is, in this view, a roof truss. User desires to determine pitch 102 of work piece 100. Elongated base 12 is placed upon work piece 100 with arm 14 being placed upon angle portion 104. Although FIG. 3 shows one application, it is apparent to one skilled in the art that any angle or pitch can be measured using tool 10.

Figure 4A:
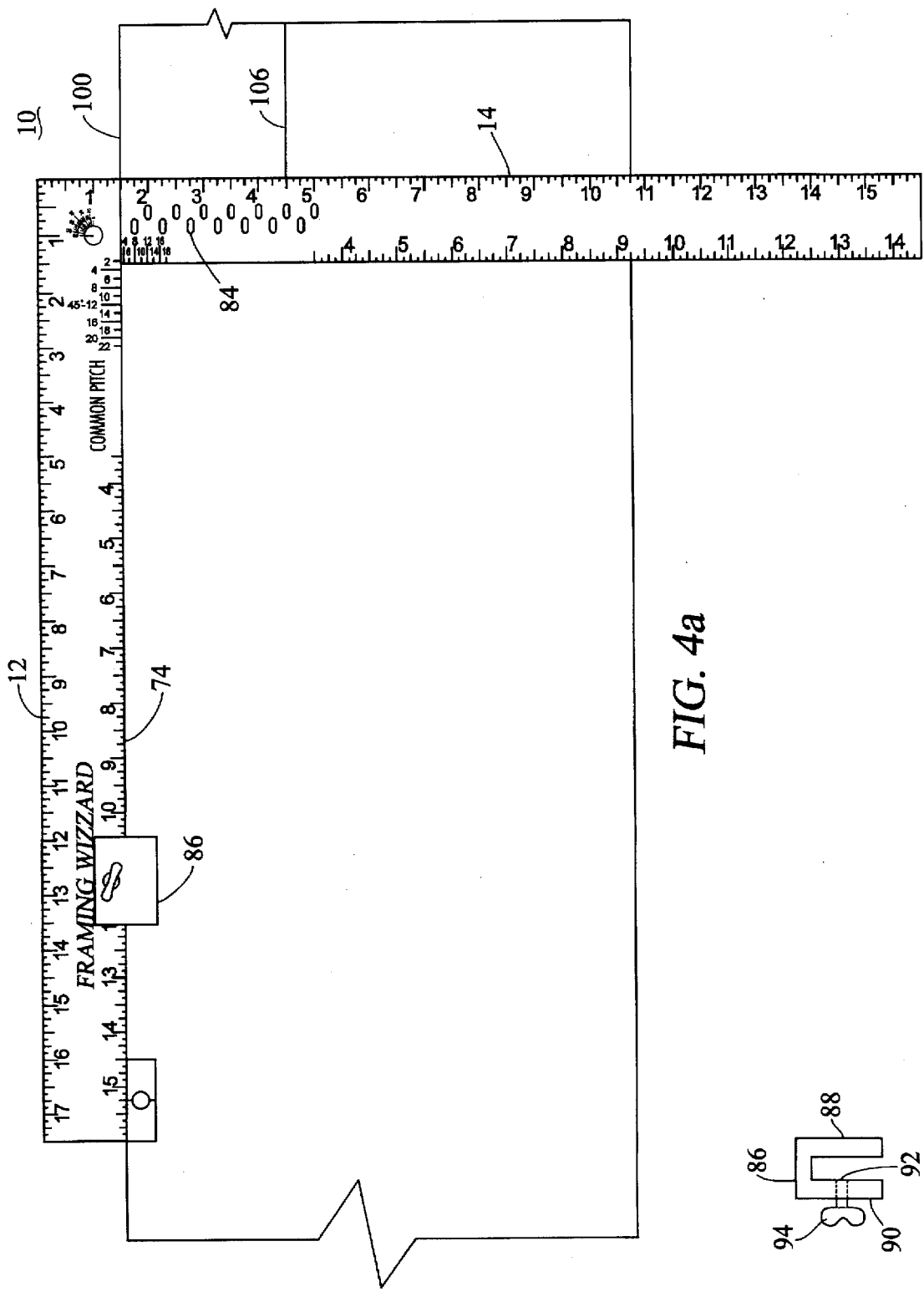
FIG. 4a and 4b show the device as a ripping guide and layout adjuster.

Referring now to FIG. 4a, there is shown generally at 10 the tool of the present invention as used to provide a ripping guide to mark rip guide line 106 along work piece 100. Interior edge 74 is placed on work piece 100 on a top side which allows tool 10 to slide freely along the upper side of work piece 100. Plural openings 84 are placed at said distances along arm 14. Pencil or other marking utensil is placed in the desired opening 84 and elongated base 12 is run along upper side work piece 100 thereby providing rip guide line 106.

Figure 4B:
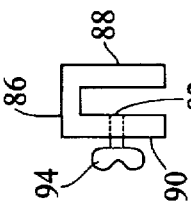

Referring again to FIGS. 4a and 4b, there is shown generally at 86 the layout adjuster of the present invention. In the preferred embodiment, adjuster 86 is made with the same dimensions as elongated base 12 to provide easy manufacturing. Adjuster has tongue 88 which fits into and can slide along channel 30 (FIGS. 2b and 2c). Web 90 contacts face 58 of base 12. Web 90 has hole 92 for receiving contact screw 94 which holds adjuster 86 in place. Adjuster 86 allows user to set studs and other framing pieces at something other than the sixteen inches on center as shown in FIGS. 1a and 1b.

Thus, although there have been described particular embodiments of the present invention of a new and useful folding framing square and layout tool, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A device for use in carpentry comprising:
   a. an elongated base having a face and an inner edge; and
   b. an arm pivotally connected to said elongated base at a pivot point such that said device having an open and a closed position wherein said arm and said elongated base are aligned along one plane in said closed position and said arm and said elongated base are aligned at a preset angle in said open position;
   c. means for correcting said preset angle comprising a set screw received by a threaded orifice in said elongated base and contacting said arm, said elongated base having a channel; and
   d. a layout adjuster slidably attached to said elongated base opposite said arm within said channel, said layout adjuster having a tongue received by said channel and a web contacting said face, said web having a hole for receiving a contact screw, said screw for holding said layout adjuster in place.

2. The device of claim 1 wherein said preset angle is approximately ninety degrees.

3. The device of claim 1 further comprising a pitch gauge printed on said inner edge.

4. The device of claim 3 wherein said arm having a ripping guide.

5. The device of claim 1 further comprising said arm having an interior edge, said interior edge having a pitch guide.

6. The device of claim 1 further comprising a tab attached to said elongated base opposite said arm, said tab being approximately the same width as said arm, said arm and said tab being a preset distance apart.

7. The device of claim 1 further comprising:
   a. said inner edge having a common pitch gauge;
   b. said interior edge having a hip valley gauge; and
   c. said arm having a ripping guide.

8. The device of claim 1 wherein comprising:
   a. said interior edge having a common pitch gauge;
   b. said inner edge having a hip valley gauge.

9. The device of claim 1 further comprising a common pitch gauge printed on said elongated base proximal said pivot point.

10. The device of claim 1 further comprising a hip-valley roof pitch gauge printed on said arm proximal said pivot point.

11. A folding framing square and layout tool comprising:
   a. an elongated base having a first end and a second end;
   b. an arm pivotally attached to said elongated body proximal said first end at a pivot point such that said device having an open position wherein said arm being a preset angle from said elongated body and a closed position wherein said arm and said elongated body being approximately zero degrees from one another;
   c. said base having an inner edge and an outer edge, a first pitch gauge printed on said inner edge;
   d. said arm having an exterior edge and an interior edge, a second pitch gauge printed on said interior edge;
   e. said arm having a ripping guide to mark a rip guide line.

12. A folding framing square comprising:
   a. an elongated base having two faces, a channel between said faces an inner edge and an outer edge;
   b. an arm pivotally attached to said elongated base within said channel such that said arm and said elongated base being approximately aligned along a single plane in a closed position and being a preset angle from said elongated base in an open position;
   c. said elongated base having a threaded orifice running from said outer edge to said inner edge; and
   d. a screw received by said orifice extendible through said orifice to contact said arm for adjusting said preset angle.

13. The framing square of claim 12 wherein:
   a. a tab attached to said elongated base opposite said arm, said tab being approximately the same width as said arm, said arm and said tab being a preset distance apart.

14. The framing square of claim 12 further comprising a layout adjuster slidably attached to said elongated base opposite said arm within said channel, said layout adjuster having a tongue received by said channel and a web contacting said face, said web having a hole for receiving a contact screw, said screw for holding said layout adjuster in place.

15. The framing square of claim 12 further comprising an inner linear gauge along an inner edge of said elongated base and an outer linear gauge along an outer edge of said elongated base.

16. The framing square of claim 12 wherein said arm having an interior gauge placed along an interior edge of said arm and an exterior gauge placed along an exterior edge of said arm.

17. The framing square of claim 12 further comprising a pitch gauge along an inner edge of said elongated base for indicating the pitch of a work piece by location of said arm along said pitch gauge.

18. The framing square of claim 12 further comprising a pitch gauge along an interior edge of said arm for indicating the pitch of a work piece by location of said elongated base along said pitch gauge.

19. The framing square of claim 12 further comprising means for setting ripping lines attached to said arm.

20. The framing square of claim 12 further comprising an adjuster releasibly attached into said channel.

* * * * *